(12) United States Patent
Cheng et al.

(10) Patent No.: US 8,417,952 B2
(45) Date of Patent: Apr. 9, 2013

(54) METHOD FOR DIGITAL RIGHTS MANAGEMENT IN A MOBILE COMMUNICATIONS NETWORK

(75) Inventors: Yi Cheng, Sundbyberg (SE); Luis Barriga, Bandhagen (SE); Karl Norrman, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 12/809,125

(22) PCT Filed: Dec. 19, 2007

(86) PCT No.: PCT/SE2007/051043
§ 371 (c)(1),
(2), (4) Date: Jun. 18, 2010

(87) PCT Pub. No.: WO2009/078775
PCT Pub. Date: Jun. 25, 2009

(65) Prior Publication Data
US 2010/0281262 A1 Nov. 4, 2010

(51) Int. Cl.
*H04L 9/32* (2006.01)
(52) U.S. Cl. .................................................... 713/171
(58) Field of Classification Search ............... 713/171
See application file for complete search history.

(56) References Cited

U.S. PATENT DOCUMENTS

| 2002/0157002 A1 | 10/2002 | Messerges et al. | |
| 2005/0246282 A1* | 11/2005 | Naslund et al. | 705/52 |
| 2006/0129848 A1* | 6/2006 | Paksoy et al. | 713/193 |

FOREIGN PATENT DOCUMENTS

| EP | 1860586 A1 | 11/2007 |
| WO | 2005036854 A1 | 4/2005 |

(Continued)

OTHER PUBLICATIONS

Messerges, T.M., et al., "Digital Rights Management in a 3G Mobile Phone and Beyond", ACM Workshop on Digital Rights Management archive, Washington D.C., USA, 2003, pp. 27-38.

(Continued)

*Primary Examiner* — Kambiz Zand
*Assistant Examiner* — Stephen Sanders
(74) *Attorney, Agent, or Firm* — Rothwell, Figg, Ernst & Manbeck, P.C.

(57) ABSTRACT

The present invention relates to a method and an operator network node for enabling a user-defined DRM domain of *SIMs hosted by *SIM-enabled devices. The operator network node is connectable to a *SIM based device and to a content provider node, and comprises means for establishing a secure channel between a *SIM-based device and an operator network node, means for creating a DRM domain defined by at least one user of *SIM-based devices, means for receiving at the operator network node a registration request from the *SIM-based device to register the *SIM of the *SIM-based device into the created user-defined DRM domain, means for registering at the operator network node the *SIM of the *SIM-based device into the registered user-defined DRM domain, and means for making the registered information associated with the user-defined DRM domain available to the content provider. The invention also relates to a further method and the content provider comprising means for accessing in the operator network node registered information associated with a registered user-defined DRM domain comprising *SIMs of a user, and means for establishing a content provider defined DRM domain comprising at least one of the *SIMs of the user-defined DRM domain.

28 Claims, 6 Drawing Sheets

FOREIGN PATENT DOCUMENTS

| WO | 2006117555 A2 | 11/2006 |
|---|---|---|
| WO | 2007108619 A1 | 9/2007 |

OTHER PUBLICATIONS

Abbadi, I., et al. "Digital Rights Management Using a Mobile Phone", Proceedings of the Ninth International Conference on Electronic Commerce, 2007, Aug. 20, 2007, pp. 185-194, XP002677907.

Koster, P., et al., "Introduction of the Domain Issuer in OMA DRM", Consumer Communications and Networking Conference, 2007, CCNC 2007-20-07, 4th IEEE, IEEE, PI, Jan. 1, 2007, pp. 940-944, XP031087921.

Vasanta, H., et al., "Distributed Management of OMA DRM Domains", Aug. 28, 2006, Information Security Applications, pp. 237-251, XP019077666.

Oma et al., "OMA DRM Specification V 2.0", OMA-DRM-DRM-V2_0-20040320-D, Mar. 20, 2004, 125 pages, XP55002061.

Supplementary European Search Report dated Jul. 3, 2012, in corresponding European Application No. EP07861138, 8 pages.

* cited by examiner

METHOD FOR DIGITAL RIGHTS MANAGEMENT IN A MOBILE COMMUNICATIONS NETWORK

CROSS-REFERENCE TO RELATED APPLICATION

This application is a 35 U.S.C. §371 National Phase Application from PCT/SE2007/051043, filed Dec. 19, 2007, and designating the United States.

TECHNICAL FIELD

The present invention relates to Digital Rights Management (DRM) and in particular to a methods and arrangements for enabling a user-defined DRM domain for devices hosting a type of a Subscriber Identity Module (*SIM).

BACKGROUND

There is a growing need for a rights management system in the mobile industry so that the operators and content providers can make digital content available to consumers in a controlled manner. DRM refers to technologies that make it possible for publishers and copyright holders to control the usage of digital media by preventing access copying or conversion to other formats by unauthorized end-users.

The OMA (Open Mobile Alliance) DRM system enables content issuers to distribute protected content and rights issuers to issue rights objects for the protected content. The DRM system is independent of media object formats, operating systems, and runtime environments. Content protected by the DRM can be of a wide variety: games, ring tones, photos, music clips, video clips, streaming media, etc. For User consumption of the content, users acquire permissions to protected content by contacting rights issuers. Rights issuers grant appropriate permissions for the protected content to user devices. The content is cryptographically protected when distributed; hence, protected content will not be usable without an associated rights object issued for the user's device. The protected content can be delivered to the device by any means (over the air, LAN/WLAN, local connectivity, removable media, etc.). But the rights objects are tightly controlled and distributed by the rights issuer in a controlled manner. The protected content and rights objects can be delivered to the device together, or separately.

Figure 1:
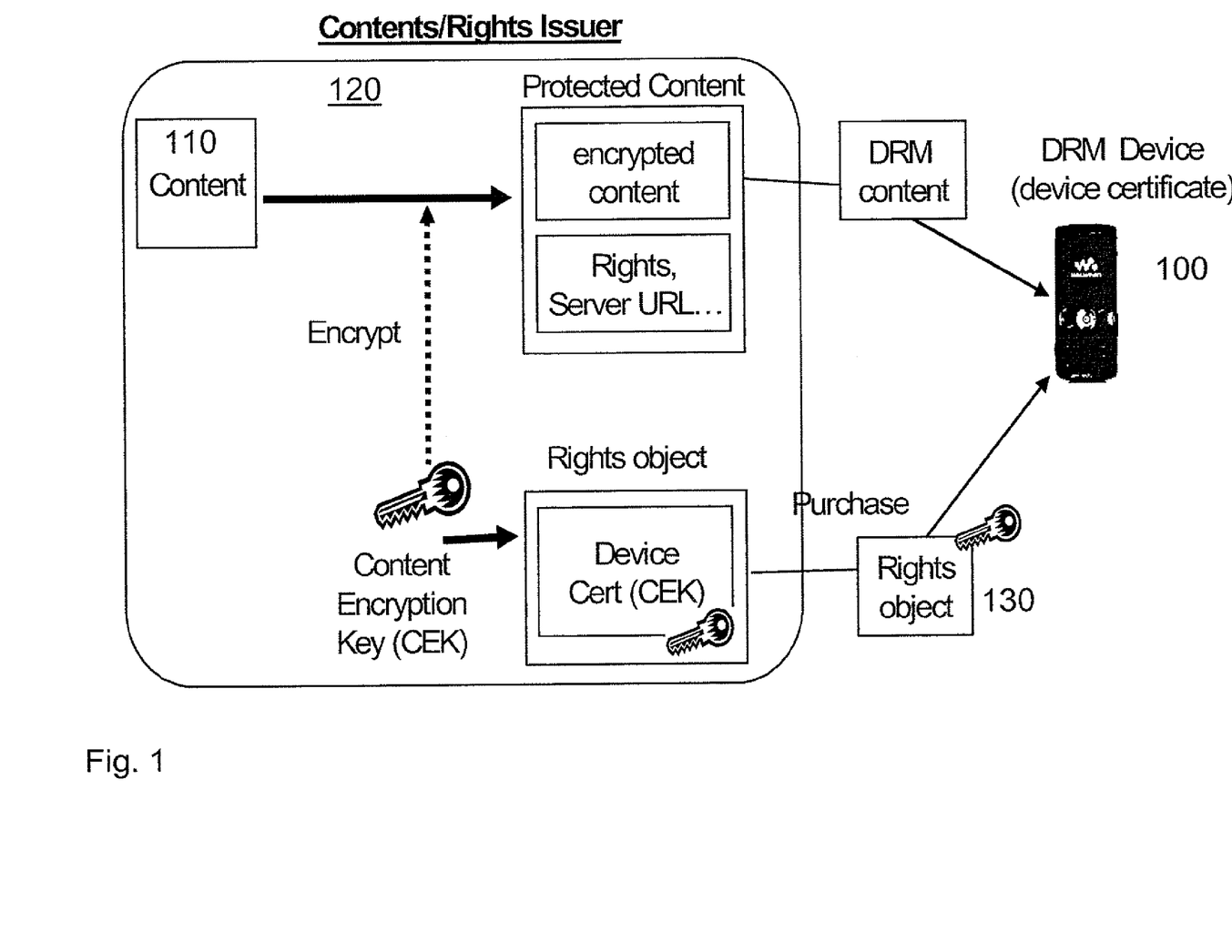
FIG. 1 illustrates how the content is bound to the device in OMA DRM according to prior art.

In OMA DRM, the content 110 is bound to the device 100 as illustrated in FIG. 1. For DRM to work properly, the user has to enroll (register) his/her personal devices 100 with the rights issuer authority 120. Once a device 100 is registered, the user can purchase content 110 and associated right objects 130 for that specific device 100. Only that device 100 can use the rights object 130 to consume the content 110.

Figure 2:
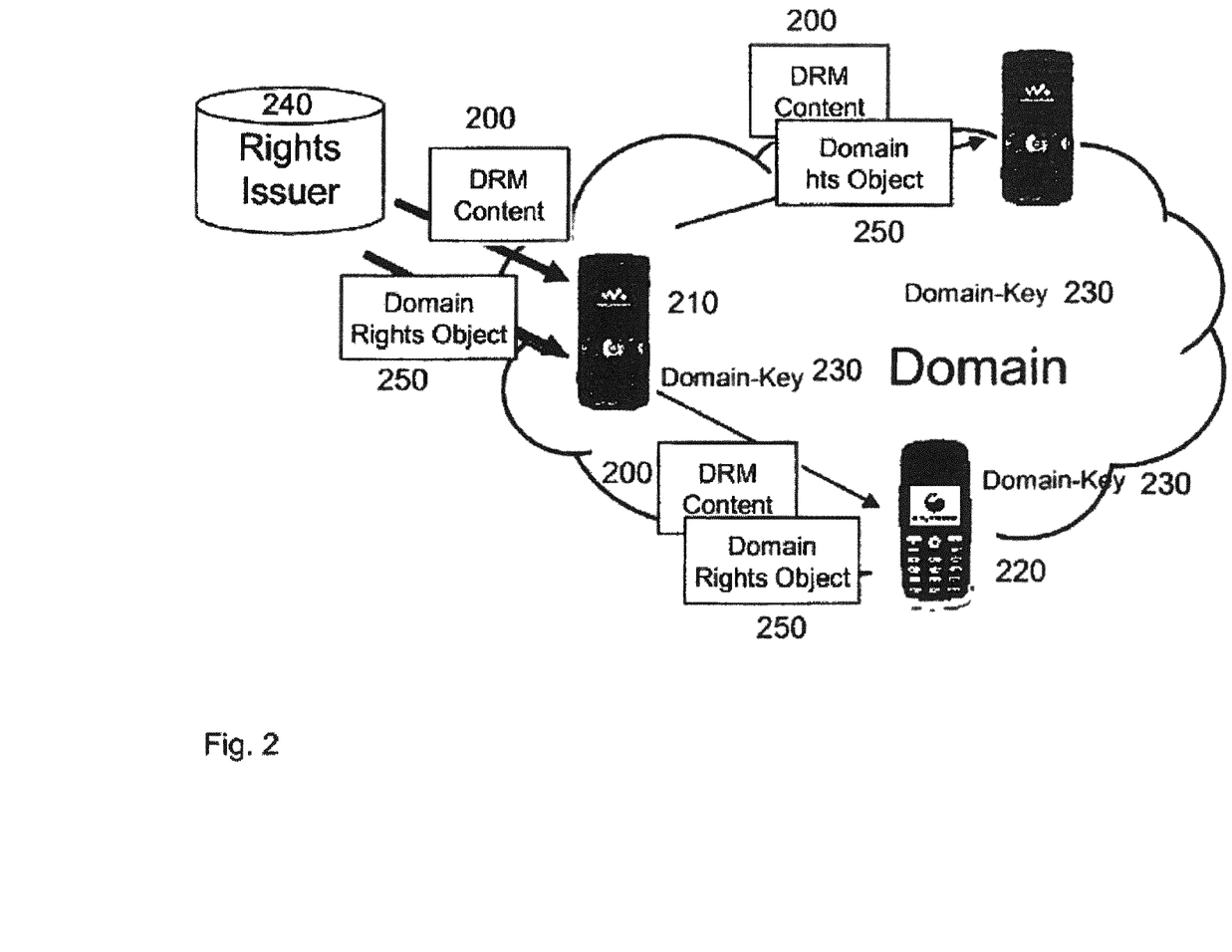
FIG. 2 illustrates an OMA DRM Device Domain according to prior art.

Further content and rights may be shared among a set of devices authorized into a domain. This is explained in Digital Rights Management v2.0, Open Mobile Alliance, OMA-TS-DRM-DRM-V2_0 and illustrated by FIG. 2. I.e. a given subscriber may be allowed to share service/content 200 among several personal enrolled (authorized) devices 210, 220. OMA DRM assumes the existence of a Public Key Infrastructure (PKI) and that the devices 210, 220 are DRM-enabled with digital certificates and DRM agents. All devices within the domain possess a common domain key 230 issued by the rights issuer 240. They are able to consume and share content 200 controlled by domain rights objects 250. The domain rights object 250 can be decrypted only with the domain-key 230.

OMA BCAST further defines a PKI based DRM profile for service and content protection that allows a DRM device domain to be part of a broadcast domain. The DRM profile is based on OMA DRM which requires public key certificates and trusted DRM Agents.

OMA BCAST also defines a *SIM based smartcard profile, that applies to *SIM-enabled devices that want to be part of a broadcast domain. The term "*SIM" is used in this specification to include SIM, USIM, ISIM or any other future type of SIM, e.g. software-based or downloadable. The Smartcard profile adopts Multimedia Broadcast Multicast Service (MBMS) security mechanisms and relies on *SIM for establishing trust. Furthermore, to be able to bind content to device in addition to the *SIM, the smartcard profile specifies means for service providers to provision a terminal binding key to trusted devices.

The DRM profile supports the enablement of a device domain by using domain key and domain rights objects. However, in the smartcard profile, currently there is no counterpart to support a *SIM-based device domain.

This implies that a group of *SIM-based devices are not able to share content or a broadcasted service. Instead, each *SIM-based device would need to handle protected content separately, which is neither convenient from an end-user point of view, nor optimal for right issuers and service providers.

As stated above, one problem with the device domain is that if the user purchases content from different sources, she/he has to register her/his device domain with each right issuer involved.

In OMA Secure Content Exchange (SCE) architecture, a new domain concept called user domain has been introduced. Different from the device domains, user domains are managed by a central domain authority. The user has to register her/his devices with the domain authority only once and can then purchase content for the registered domain from various sources. This central domain authority architecture is only suitable for DRM devices and not for devices supporting the smartcard profile.

Therefore, it is desired to solve the issues of defining mechanisms for the user to enroll devices to a user domain, the protocol for rights issuer to retrieve domain information from the domain authority, and the necessary security mechanisms.

SUMMARY

As stated above, the current DRM standard does not allow creating a user DRM domain of *SIM-enabled devices. Thus, the object of the present invention is to introduce and define a user DRM domain of *SIM-based devices so that *SIM-based devices of one user-defined domain can receive a session jointly and individually playback content of that have been previously received in a multicast/broadcast session or downloaded.

This is according to a first aspect achieved by a method for an operator network node for enabling a user-defined DRM domain of *SIMs hosted by *SIM-enabled devices wherein the operator network node is connectable to a *SIM based device and to a content provider node. The method comprises the steps of establishing a secure channel between a *SIM-based device and an operator network node and creating a DRM domain defined by at least one user of *SIM-based devices. The operator network node receives a registration request from the *SIM-based device to register the *SIM of the *SIM-based device into the created user-defined DRM domain, and then registers the *SIM of the *SIM-based device into the registered user-defined DRM domain. The registered information associated with the user-defined DRM domain is then made available to the content provider such that the content provider can establish a content provider defined subdomain comprising at least one of the registered *SIMs of the user-defined DRM domain.

The object is according to a second aspect achieved by a method for a content provider node for establishing a DRM domain of *SIM-enabled devices wherein the content provider node is connectable to a *SIM-based device and to an operator network node. The method comprises the steps of accessing in the operator network node registered information associated with a registered user-defined DRM domain comprising *SIMs of a user, and then establishing a content provider defined DRM subdomain comprising at least one of the *SIMs of the user-defined DRM domain.

The object is according to a third aspect achieved by an operator network node for enabling a user-defined DRM domain of *SIMs hosted by *SIM-enabled devices, wherein the operator network node is connectable to a *SIM based device and to a content provider node. The node comprises means for establishing a secure channel between a *SIM-based device and an operator network node and means for creating a DRM domain defined by at least one user of *SIM-based devices. It comprises further means for receiving a registration request from the *SIM-based device to register the *SIM of the *SIM-based device into the created user-defined DRM domain and means for registering the *SIM of the *SIM-based device into the registered user-defined DRM domain. Means for making the registered information associated with the user-defined DRM domain available to the content provider is also provided such that the content provider can establish a content provider defined subdomain comprising at least one of the registered *SIMs of the user-defined DRM domain.

The object is according to a fourth aspect achieved by a content provider node for establishing a DRM domain of *SIM-enabled devices wherein the content provider node is connectable to a *SIM-based device and to an operator network node. The content provider node comprises means for accessing in the operator network node registered information associated with a registered user-defined DRM domain comprising *SIMs of a user, and means for establishing a content provider defined DRM subdomain comprising at least one of the *SIMs of the user-defined DRM domain.

The main advantage of the present invention s that *SIM-based devices can be grouped into DRM domains and share service/content, e.g. BCAST or upcoming IMS-based services.

A further advantage with the present invention is that an operator can offer a user DRM service, i.e. *SIM-based domain information, towards third authorized parties.

A yet further advantage is that the subscriber does not need to register her/his *SIM-based domain at each rights issuer.

BRIEF DESCRIPTION OF THE DRAWINGS

Exemplifying embodiments of the invention will now be described in more detail with reference to the accompanying schematic drawings.

DETAILED DESCRIPTION

The purpose of the present invention is to extend the semantics of OMA 2.x DRM domain to cover *SIM-enabled devices. The term "*SIM" is used in this specification to include SIM, USIM, ISIM or any other future type of SIM, e.g. software-based or downloadable. A *SIM-enabled device is a device that can talk to a UICC (Universal Integrated Circuit Card) with a *SIM application. The UICC is the chip card used in mobile terminals and it ensures integrity and security of personal data. The UICC further contains a *SIM-application and other applications. In a GSM network the UICC contains a SIM application and in a UMTS network the UICC contains a USIM application. With the UMTS release 5 a new application, the ISIM (IP multimedia Services Identity Module) is required for services in the IMS.

The present invention requires that a secure channel is established between the user and the operator network and between the user and the content provider, respectively. The secure channel may be established by having a network comprising a GBA (Generic Bootstrapping Architecture) functionality for distributing keys to be shared. Note that GBA is a client-server architecture where some functionality is needed in the device and some in the network server. The GBA server functionality requires a Bootstrapping Server Function (BSF) in the network located at the operator and a server Network Application Function (NAF) in the application providing a service (i.e. at the content provider). The corresponding GBA/NAF client functionality is assumed to exist in the UE.

Figure 3:
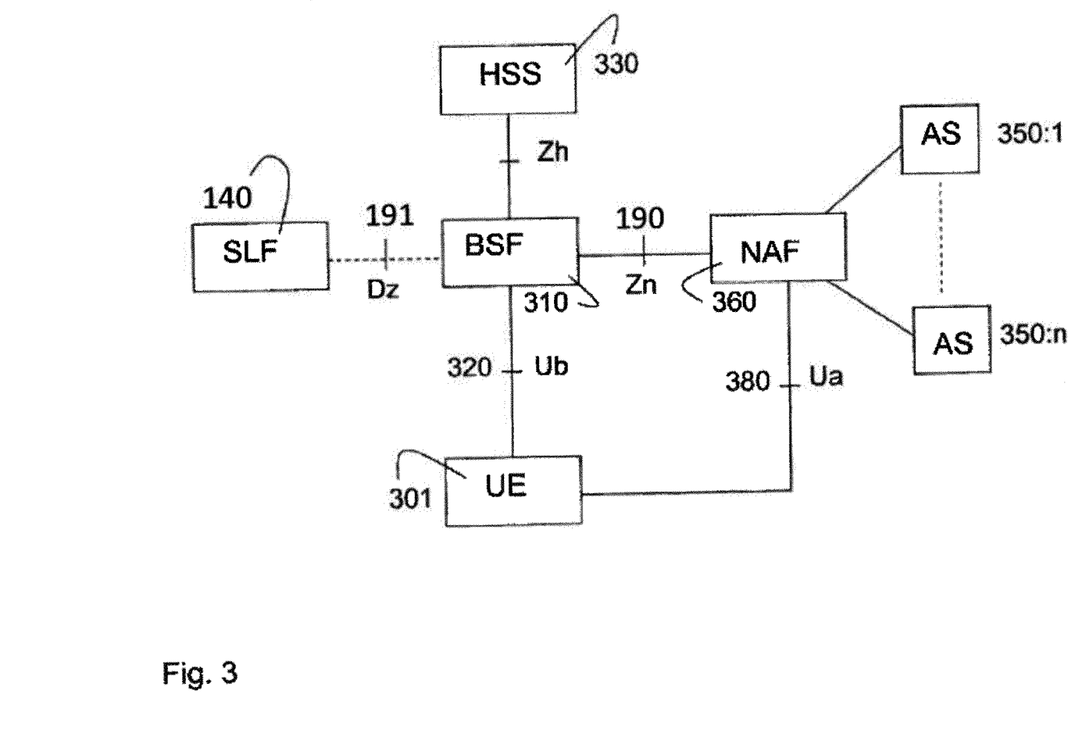
FIG. 3 shows a reference model for bootstrapping keys according to prior art.

FIG. 3 shows a reference model for bootstrapping keys in the NAF 360 and the UE 301 with support from a Bootstrapping Server Function (BSF) 310 and the HSS 330. The NAF 360 may be associated with a content provider application 350:1 . . . 350:n providing a service to the UE 301. The UE 301 is connected to the BSF 310 managed by the operator via the Ub interface 320 and the UE is also connected to the NAF e.g. associated with a content provider via the Ua interface 380. Further, the NAF and the BSF are connected via the Zn interface and the BSF is further connected to the HSS via the Zh interface. In accordance with the description above, the UE comprises a BSF client and a NAF client.

FIG. 3 illustrates prior art deployment of GBA/GAA through an authentication proxy 360 acting as a NAF against the GBA/GAA infrastructure. A generic BSF 310 and a UE 301 are mutually authenticated using the UMTS Authentication and Key Agreement (AKA) protocol. The UE 301 and the HSS 330 shares a key that is basis for the HSS 330 to generate an authentication vector provided to the BSF 310. According to the AKA protocol, the BSF 310 sends to the UE 301 a challenge and the UE 301 returns a response to the BSF 310. The authentication is verified by the BSF 310 comparing the UE 301 response with an expected response as provided by the HSS 330. Successful authentication initiates at the BSF 310 and the UE 301 generation of a shared key Ks. The BSF 310 stores the key Ks and an associated reference B-TID. The reference B-TID and other data, such as a key lifetime, are thereafter provided to UE 301 in a completion message.

A Subscriber Locator Function (SLF) 140 is queried by the BSF 310 over interface Dz 191 in conjunction with the Zh interface operation to get the name of the HSS 330 containing the required subscriber specific data. The UE 301 may connect simultaneously to at least one Application Server AS 350:1-n through a Network Application Function authentication proxy 360. The connection comprises a first step of authentication between the UE 301 and the NAF 360. Thereby, the UE 301 provides the reference B-TID to the NAF 360 that, using B-TID, requests a key (Ks_NAF) from the BSF 310 over the interface Zn 190. The key Ks_NAF is derived from the key Ks. The same key may be derived at the UE 301. Authentication is thereafter, made based on the derived key Ks_NAF.

The basic idea of the present invention is to introduce an entity denoted *SIM-DRM Enabler that resides in the operator's domain, i.e. in an operator network node. A secure channel between the *SIM-based device and the *SIM-DRM enabler is established. The bootstrapping procedures described above can be used for this purpose. The DRM enabler can upon request from one or more users create a user-defined DRM domain of *SIM based devices. The DRM enabler can then receive a registration request from the *SIM-based device to register a *SIM of a *SIM based device into the user-defined user domain. The *SIM based devices of the user-defined domain are stored in the DRM enabler and this information associated with the user-defined DRM domain can be made available to a content provider, preferably authorized by the user such that the content provider can establish a content provider defined subdomain comprising at least one of the registered *SIMs of the user-defined DRM domain.

Figure 4:
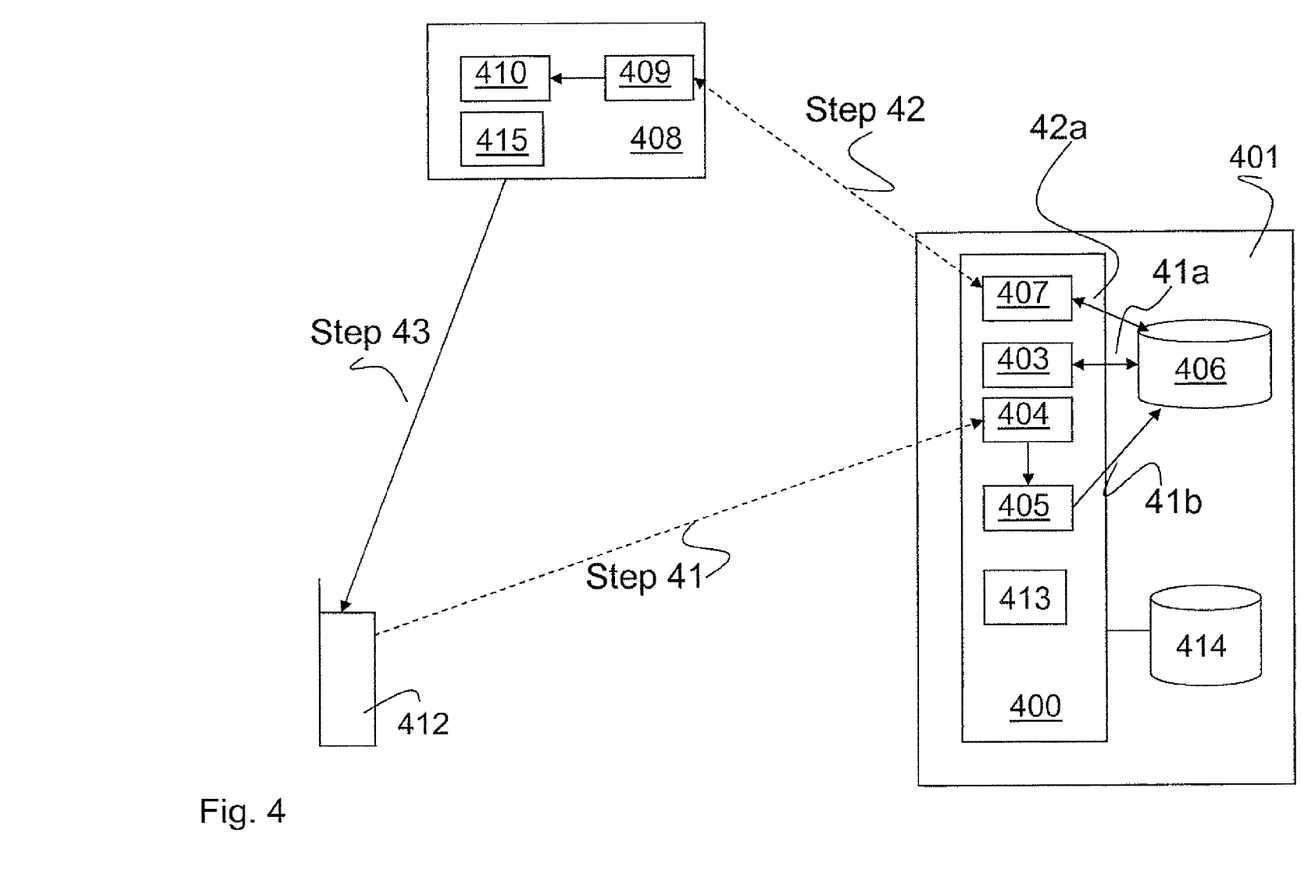
FIGS. 4 and 5 illustrates schematically embodiments of the present invention.

Thus the DRM enabler 401 as illustrated in FIG. 4, e.g. implemented by software means, comprises means for establishing 402 a secure channel between the *SIM-based device 412 and the operator network node 400 by e.g. using the bootstrapping procedures as described above. It further comprises means for creating 403 a DRM domain defined by one or more users, means for receiving 404 at the operator network node a registration request from a *SIM-based device to register the *SIM into the created user-defined DRM domain and means for registering 405 at the operator network node the *SIM of the *SIM-based domain into the registered user-defined DRM domain. The operator node comprises a memory 406 for storing at least the registered user-defined domain and the registered *SIMs. This memory may be located in the DRM enabler. It should be noted that one DRM enabler and the operator node is preferably configured to handle several user-defined domains and information associated to the domains. Moreover, the DRM enabler comprises means for making 407 the registered information associated with the user-defined DRM domain available to the content provider 408 such that the content provider 408 can establish a content provider defined subdomain comprising at least one of the registered *SIMs of the user-defined DRM domain.

Further the operator network node may comprise further processing 413 and storing means 414. The processing means comprises means for registering which users are allowed to register their devices onto said DRM domain, and authorizing each user before registration of a *SIM hosted on a user's *SIM based device, authenticating the *SIM-based device (e.g. by using a device certificate), means for binding the *SIM-based device to the registered *SIM by storing a trusted identity of said device, receiving at the operator network node a registration request from the *SIM-based device to register an identity of the *SIM-based device hosting the registered *SIM, registering by the DRM enabler the identity of the *SIM-based device, making information on a device profile of the *SIM based device hosting the registered *SIM available to the content provider node in order to establish device trust receiving an authorization request from the user to authorize a set of content providers to access the user-defined DRM domain, authorizing each content provider before making the registered information associated with the user-defined DRM domain available to the content provider.

The storing means 414 may comprise means for storing the identity of the *SIM-based device.

Accordingly, a content provider node 408 connectable to a *SIM-based device and to an operator network node 400 comprises according to an embodiment of the present invention means for accessing 409 in the operator network node 400 registered information associated with a registered user-defined DRM domain comprising *SIMs of a user, and means for establishing 410 a content provider defined DRM subdomain comprising at least one of the *SIMs of the user-defined DRM domain.

Furthermore, the content provider node 408 may further comprise processing means 415 comprising means for accessing in the operator network node registered information associated with the identity of the *SIM-based device hosting the registered *SIM. The processing 415 may also comprise means for excluding a *SIM-based device from the user-defined DRM domain when it does not satisfy a content provider policy on device trust based on the registered information associated with the identity of the *SIM-based device, providing the protected content to the *SIM-based device provided that the *SIM-based device can provide proof of successful authentication.

issuing and provisioning credential that will allow the content provider defined subdomain to receive a protected service by using a pull client-initiated GBA/GAA.

sending an authenticated request for NAF session initiation to each of the *SIM based devices hosting the *SIMs of the user-defined domain to trigger the *SIM based device to launch a normal GBA.

Further, the *SIM based device 412 connectable to the content provider node 408 via the operator network, is configured to request the operator network to create a user-defined DRM domain, and to send a registration request to the operator network to register the *SIM into the created user-defined DRM domain.

The present invention is further explained by the description of the method according to one embodiment which is illustrated by the arrows denoted step 41-step 43 in FIG. 4.

In step 41 of FIG. 4, a user, or a group of users, defines 41a a DRM domain of *SIM-based devices e.g. a UE, a set top box and a TV set, by registering 41b at the operator the *SIM cards of those devices that she/he wants to belong to the user-defined DRM domain. In order to prevent an attacker from registering to the same DRM domain of *SIM-based devices, the user or the group of users may also register which users that are allowed to register their devices onto said user-defined DRM domain. The user may also as an option register the identity of device hosting the corresponding *SIM. It should be noted that the user may also be referred to as a subscriber within this specification.

By means of the DRM enabler, the operator keeps track, on a per subscription base, of all *SIMs that belong to the user-defined DRM domain. Hence, the operator comprises means for storing a list of *SIMs that belong to the user-defined DRM domain. Optionally, by the user's request, the DRM enabler may also be adapted to store the device that hosts the *SIM.

In step 42, the operator also makes 42a this information available to content providers that preferably are authorized by the user or another party to access information associated with the user-defined DRM domain. That implies that a content provider node is connectable to the DRM enabler such that relevant information from the DRM enabler can be made available to the content provider node. The operator may also make information relating to the device hosting the corresponding *SIM available to the content provider.

The content provider, also referred to as service provider (SP) can discover a given user-defined DRM device domain using the user's identity assuming that said content provider has been authorized by the user. The content provider can then define a DRM subdomain comprising at least one *SIM of the user-defined DRM domain for that given user, or a given group of users. Thus, the content provider may choose to exclude some devices from the user-defined DRM domain when those do not satisfy the content provider policy on device trust.

In step 43, the content provider then distributes the necessary right objects, e.g. the domain key, that will allow the devices hosting the *SIMs that belong to the content provider's *SIM-based device domain to receive content. The content provider can then deliver the service to the *SIM-based devices of the *SIM based device domain or to a selected subset of devices of the *SIM based domain.

Figure 5:
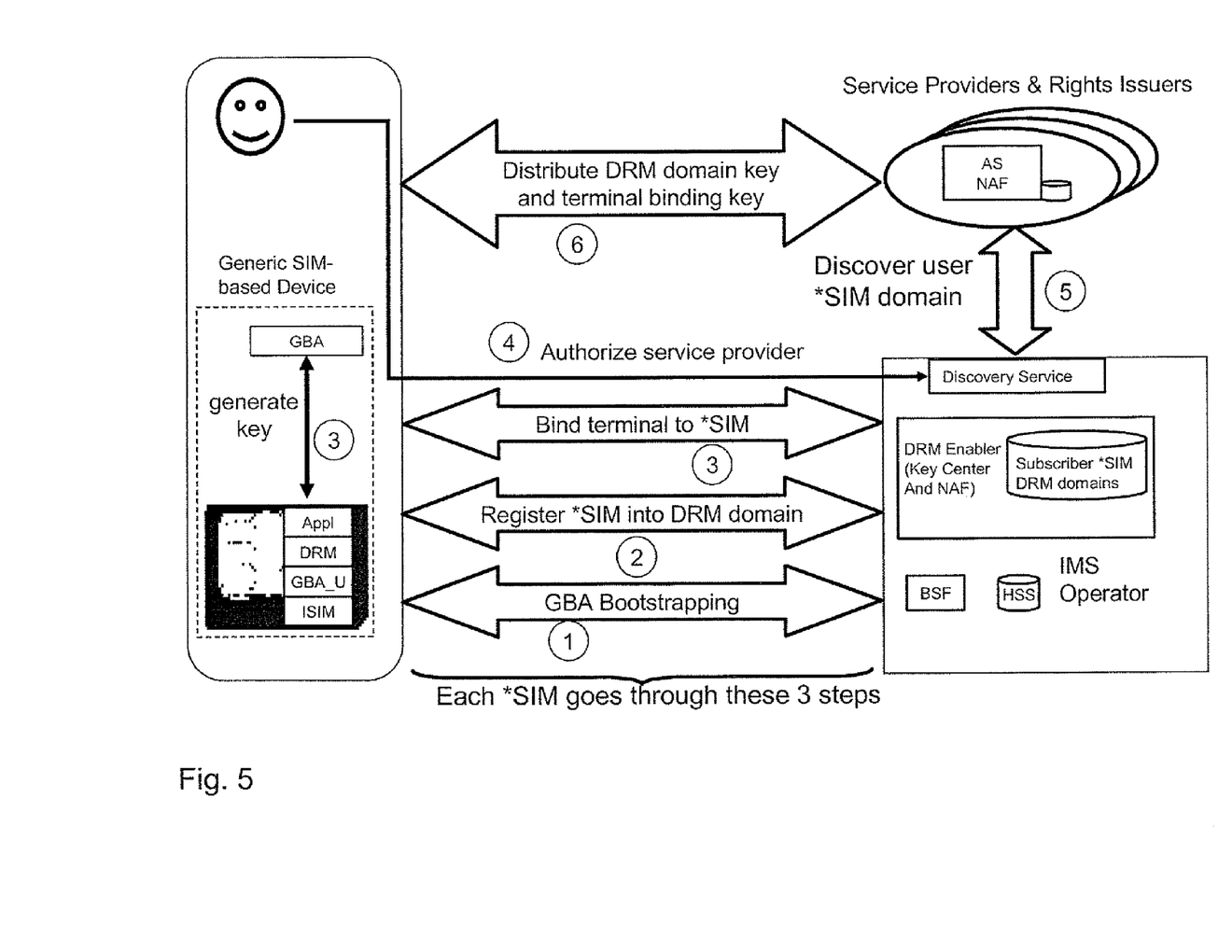

FIG. 5 shows in more detail the steps for setting-up a *SIM-based device domain in accordance with one embodiment. The operator is assumed to have deployed the BSF and the DRM enabler with a key center and NAF functionality e.g. according to the 3GPP specifications TS 33.220, 33.222, 33.110. The content provider is assumed to act as rights issuer and has deployed an AS (Application Server) with NAF functionality for the DRM end-user service.

The user, i.e. the terminal, needs to trigger the bootstrapping (step 1), registration (step 2), and the authentication (step 3) of *SIM based devices for each *SIM that the user wants to be part of the domain. The user may also explicitly authorize each content provider by contacting the discovery service at the operator and providing consent as illustrated by step 4. Step 5 is executed by the content provider when the content provider wants to obtain information of a given user-defined DRM domain.

Step 6 is further executed to bootstrap the necessary credentials in the *SIMs of the *SIM-based devices of the user-defined DRM domain and the devices hosting the *SIMs prior to service delivery.

The different steps for domain creation, registration, discovery and usage will now be described in more detail in accordance with one embodiment of the present invention.

During the first step each *SIM-based device performs a GBA_U bootstrapping procedure according to 3GPP standard TS 33.220 towards the BSF. As a result a shared secret Ks is available at both the *SIM of the *SIM-based device and the BSF.

Step 2 Consists of Two Parts:

2a) The *SIM-based device runs a GAA NAF procedure according to GBA/GAA standard TS 33.222. As a result a shared secret Ks_int_kc is available at both the *SIM and the DRM Enabler. From a GBA standards standpoint, this Ks_int_kc is a NAF key. The "kc" suffix means than the NAF key is generated by the BSF for the NAF server functionality in the DRM enabler Key Center. The "int" suffix means that the corresponding client-side NAF key will be generated internally in the *SIM.

2b) By using this shared secret Ks_int_kc, a secure channel is established between the *SIM device and DRM Enabler in order to register the *SIM e.g. the ISIM IMPI (IMS SIM IMs Private Id) that is to be stored by the DRM Enabler for the user-defined DRM domain of the subscriber. It should be noted that the terms user and subscriber are interchangeable in this specification. The user may at this stage define which other subscribes that are allowed to register devices onto this DRM domain. Allowing other subscribers to register their devices is useful for example when several members in a family want to share a domain.

3. Step 3 is optional, and is performed when the user selects to register the identity of the device that currently hosts the *SIM. In this case the DRM Enabler needs to authenticate the hosting device by using a device certificate. If the authentication is successful, the DRM Enabler sends the device a key (Ks_local) that is also available in the *SIM. With this key, the device can prove to the *SIM that it is an authenticated device and can afterwards receive secret data (e.g. content encryption key) from the *SIM. Device authentication and establishment of Ks_local follow the standard procedure specified in 3GPP TS 33.110.

3a) The hosting device requests the *SIM to generate Ks_local. The *SIM derives Ks_local from Ks_int_kc, with the device identity and other parameters as input.

3b) The hosting device and the Key Center perform certificated-based mutual authentication and upon successful authentication establish a secure channel between them. The Key Center derives Ks_local in the same way as the *SIM does in 3a), and sends the key to the device within the secure channel. The *SIM-DRM Enabler stores the authenticated device identity, associated to the hosted *SIM.

Step 4 is needed to allow a content provider accessing a given user-defined DRM domain of *SIMs hosted by *SIM based devices. I.e. a user explicitly authorizes a set of content providers that are allowed to access its user-defined DRM domain.

In step 5, the operator publishes information about said user's *SIM-based DRM domain following the user's privacy constraints, i.e. only authorized SP's are allowed to obtain that information. For this purpose, Liberty Identity Web Services Framework can be used.

In some special cases, when the user has requested so, the user may be contacted by the operator when a content provider is not authorized to access personal data. The content provider can then create its own content provider-defined DRM domain which can be the entire or a sub-set of the user-defined DRM domain. The content provider-defined DRM domain may be a sub-set of the user-defined DRM domain when e.g. the content provider does not want to deliver content to some of the devices e.g. due to certain policies.

In step 6, when a user subscribes his/her user-defined DRM domain to a content provider, the content provider has to issue and provision the credential that will allow the content provider defined domain, i.e. the user-defined DRM domain or a subset thereof to receive a protected service. Hence the protected content is provided to the *SIM-based device if e.g. the *SIM-based device can provide proof of successful authentication.

To achieve this, the content provider NAF server functionality fetches two keys from the BSF. The content provider NAF uses these NAF keys Ks_int_ro & Ks_ext_ro for each *SIM-based device in the content provider-defined DRM domain. The first key Ks_int_ro is used to securely communicate with the *SIM itself, whereas the second key Ks_ext_ro is intended for secure communication with the hosting device. Additionally, the content provider NAF generates a DRM Domain Key (K_dd) and Terminal Binding Key (K_tb). The domain key K_dd is intended to be shared among all devices in the domain. The content provider may additionally restrict content distribution within the domain using the terminal binding key K_tb that is shared only among a subset of the devices in the domain. The whole set of keys work effectively as right objects (RO).

There are several ways to make all these RO keys available in hosting device and *SIM. 6a. One way is to use a network-initiated provisioning push similar to ongoing GBA Push TS 33.223. The content provider NAF would fetch Ks, generate the RO keys above described, and create a package consisting of encrypted domain key $E_{Ks\_int\_ro}(K\_dd)$ and encrypted terminal binding key $E_{Ks\_int\_ro}(K\_dd)$ and send them in a single package, e.g. GBA push package, using the reachability information provided by the IMS core, i.e. within a SIP INVITE message. Upon reception, the *SIM would generate the both Ks_int_ro & Ks_ext_ro keys and decrypt the rest of the keys.

6b. An alternative method is to use conventional pull client-initiated GBA/GAA in accordance with an embodiment of the present invention. However, the device hosting the *SIM that is to be registered needs to be triggered to launch a normal GBA. This can be done manually by the user, but this is not a convenient approach since the user would need to go to each device. The alternative is that the content provider NAF sends an authenticated request for NAF session initiation to each of the devices in the domain, e.g. using SIP INVITE or WAP PUSH. Yet another approach is to rely on the operator to send a request for NAF initiation to each of the desired devices.

Figure 6:
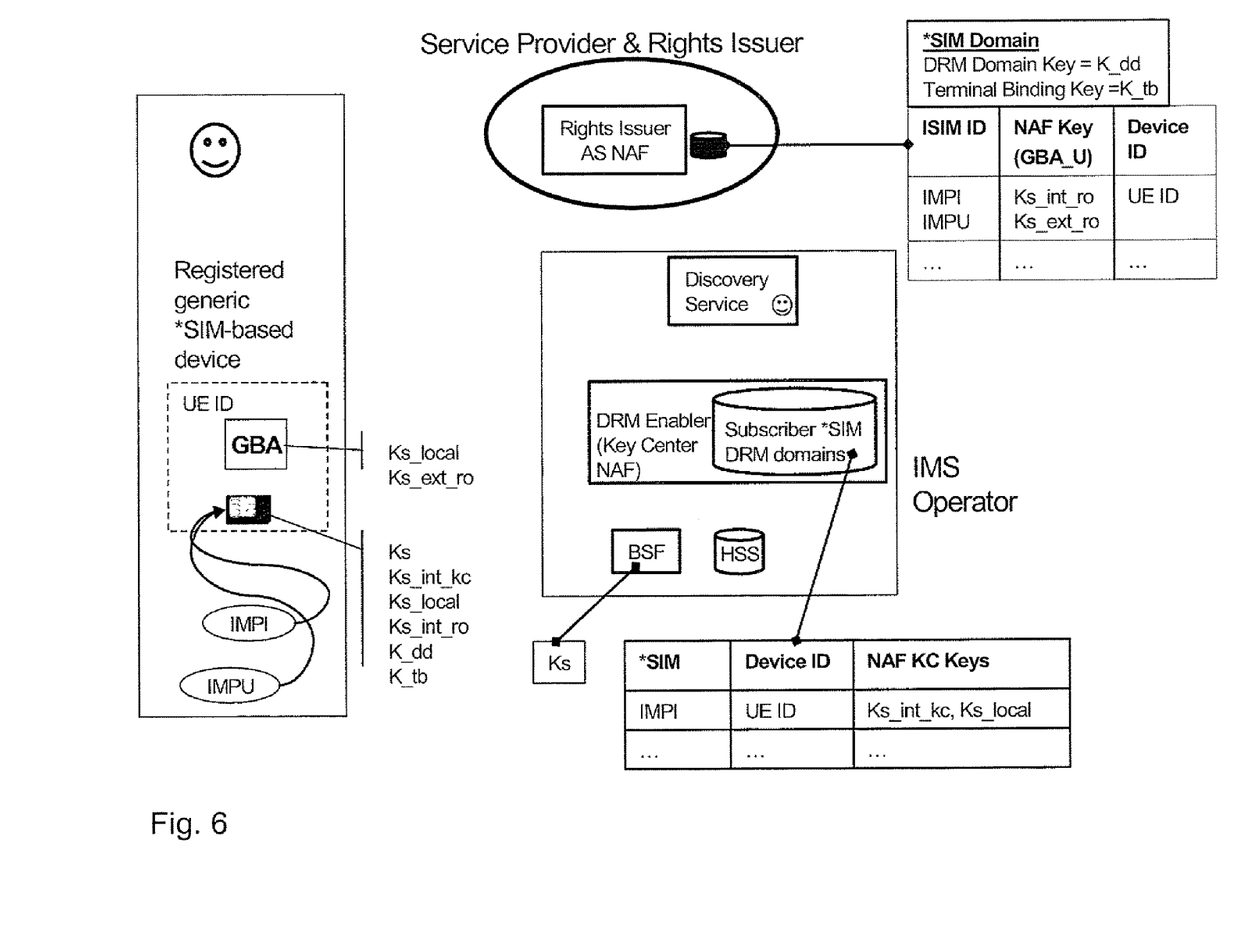
FIG. 6 illustrates the provisioning of key according to the present invention.

At the end of the registration, several keys will be provisioned in the different entities. FIG. 6 shows the keys that are the result of the execution of the procedures described in FIG. 5 for one generic registered device. I.e. the various keys that are provisioned in the hosting device, *SIM, DRM enabler and in the content provider Application Server. The keys provisioned in the hosting device are Ks_local and Ks_ext_ro and the keys provisioned in the *SIM are Ks, Ks_int_kc, Ks_local, Ks_int_ro, K_dd and K_td. (IMPI and IMPU are IMS-specific and associated with ISIM, while IMSI is associated with SIM/USIM. When USIM is used in GBA, one can derive IMPI and IMPU from IMSI.)

The DRM enabler provisions the *SIM identity such as the IMPI, the device identity and NAF keys such as Ks_int_kc and Ks_local. The content provider Application Server provisions the DRM domain key and the terminal binding key as described above. Further, the content provider application server provisions the NAF keys Ks_int_ro & Ks_ext_ro for each *SIM-based device in the content provider-defined DRM domain.

The present invention may be implemented in an IMS (IP Multimedia Subsystem), but IMS functionality is not a requirement. Thus the *SIMs described above may be an ISIM.

The above described embodiments of the invention are intended to be examples only. Alterations, modification, and variations may be effected to particular embodiments by those skilled in the art without departing from the scope of the invention, which is defined by the accompanying claims.

The invention claimed is:

1. A method for creating and managing a user-defined digital rights management (DRM) domain, the method being performed by an operator network node and comprising:

creating an internal secret key Ks_int_kc based on a shared secret key Ks using a bootstrap procedure, said internal secret key Ks_int_kc being shared with a *SIM hosted by a *SIM device, establishing a secure channel with the *SIM device using the shared internal secret key Ks_int_kc, creating a DRM domain defined by a user of the *SIM device, receiving a registration request from the *SIM device to register the *SIM of the *SIM device into the created user-defined DRM domain, registering the *SIM of the *SIM device into the user-defined DRM domain, and making the registered information associated with the user-defined DRM domain available to the content provider such that the content provider can establish a content provider defined subdomain comprising at least the registered *SIM.

2. The method according to claim 1, wherein it comprises the further steps of registering which users are allowed to register their devices onto said DRM domain, and authorizing each user before registration of a *SIM hosted on a user's *SIM based device.

3. The method according to claim 1, wherein it comprises the further steps of:

authenticating the *SIM device, binding the *SIM device to the registered *SIM by storing a trusted identity of said device, receiving at the operator network node a registration request from the *SIM device to register an identity of the *SIM device hosting the registered *SIM, and registering the identity of the *SIM device.

4. The method according to claim 3, further comprising:

authenticating the *SIM device hosting the registered *SIM by using a device certificate.

5. The method according to claim 3, further comprising: storing the identity of the *SIM device.

6. The method according to claim 3, further comprising:

making information on a device profile of the *SIM based device hosting the registered *SIM available to the content provider node in order to establish device trust.

7. The method according to claim 1, wherein it comprises the further steps of:

receiving an authorization request from the user to authorize a set of content providers to access the user-defined DRM domain, and authorizing each content provider before making the registered information associated with the user-defined DRM domain available to the content provider.

8. A method for establishing a digital rights management (DRM) domain, the method being performed by a content provider node and comprising:

obtaining from an operator network node registered information associated with a registered user-defined DRM domain comprising *SIMs of a user, wherein a *SIM stores a secret key Ks shared with the operator network node, establishing a content provider defined DRM subdomain comprising at least one of the *SIMs of the user-defined DRM domain, and for each of the *SIMs of the DRM subdomain, creating a shared internal secret key Ks_int_ro based on the shared secret key Ks using a bootstrap procedure.

9. The method according to claim 8, comprising:

accessing in the operator network node registered information associated with the identity of the *SIM device hosting the registered *SIM.

10. The method according to claim 8, further comprising:
excluding a *SIM device from the user-defined DRM domain when it does not satisfy a content provider policy on device trust based on the registered information associated with the identity of the *SIM device.

11. The method according to claim 8, further comprising providing the protected content to the *SIM device provided that the *SIM device can provide proof of successful authentication.

12. The method according to claim 8, further comprising issuing and provisioning credential that will allow the content provider defined subdomain to receive a protected service by using a pull client-initiated GBA/GAA.

13. The method according to claim 12, wherein it comprises the step of sending an authenticated request for NAF session initiation to each of the *SIM based devices hosting the *SIMs of the user-defined domain to trigger the *SIM based device to launch a normal GBA.

14. An operator network node for enabling a user-defined Digital Right Management, DRM, domain of *Subscriber Identity Modules ,*SIMs, hosted by *SIM-enabled devices, each *SIM storing a secret key Ks shared with the operator network, the operator network node is connectable to a *SIM based device and to a content provider node, the node comprises
a key generator configured to create an internal secret key Ks_int_kc based on the shared secret key Ks using a bootstrap procedure, said internal secret key Ks int_kc being shared with the *SIM,
a channel generator configured to establish a secure channel between a *SIM device and an operator network node, using the shared internal secret key Ks_int_kc,
a domain generator configured to create a DRM domain defined by at least one user of *SIM devices,
a receiver operable to receive at the operator network node a registration request from the *SIM device to register the *SIM of the *SIM device into the created user-defined DRM domain,
a register configured to register at the operator network node the *SIM of the *SIM device into the registered user-defined DRM domain, and
a publisher configured to make the registered information associated with the user-defined DRM domain available to the content provider such that the content provider can establish a content provider defined subdomain comprising at least one of the registered *SIMs of the user-defined DRM domain.

15. The operator network node according to claim 14, wherein it comprises a register further configured to register which users are allowed to register their devices onto said DRM domain, and authorize each user before registration of a *SIM hosted on a user's *SIM based device.

16. The operator network node according to claim 14, wherein it comprises an authenticator configured to authenticate the *SIM-device, a binder configured to bind the *SIM device to the registered *SIM by storing a trusted identity of said device, and a receiver further configured to receive at the operator network node a registration request from the *SIM device to register an identity of the *SIM device hosting the registered *SIM, and a second register configured to register by the DRM enabler the identity of the *SIM device.

17. The operator network node according to claim 16, wherein it comprises an authenticator further configured to authenticate the *SIM device hosting the registered *SIM by using a device certificate.

18. The operator network node according to claim 16, wherein it comprises an identity storage configured to store the identity of the *SIM device.

19. The operator network node according to claim 16, wherein it comprises a publisher configured to make information on a device profile of the *SIM device hosting the registered *SIM available to the content provider node in order to establish device trust.

20. The operator network node according to claim 14, wherein it comprises a content provider authorizer configured to receive an authorization request from the user to authorize a set of content providers to access the user-defined DRM domain, and authorize each content provider before making the registered information associated with the user-defined DRM domain available to the content provider.

21. A content provider node for establishing a Digital Rights Management, DRM, domain of *Subscriber Identity Modules, *SIM, -enabled devices, wherein a *SIM stores a secret key Ks shared with the operator network the content provider node is connectable to a *SIM device and to an operator network node, and comprises
a DRM lookup configured to access in the operator network node registered information associated with a registered user-defined DRM domain comprising *SIMS of a user,
a subdomain generator configured to establish a content provider defined DRM subdomain comprising at least one of the *SIMS of the user-defined DRM domain, and
a key center configured to create a shared internal secret key Ks_int_ro for each of the *SIMS of the DRM subdomain, based on the shared secret key Ks, using a bootstrap procedure, to securely communicate with each of the *SIMS of the DRM subdomain.

22. The content provider node according to claim 21, wherein it comprises a register lookup configured to access in the operator network node registered information associated with the identity of the *SIM device hosting the registered *SIM.

23. The content provider node according to claim 21, wherein it comprises an excluder configured to exclude a *SIM device from the user-defined DRM domain when it does not satisfy a content provider policy on device trust based on the registered information associated with the identity of the * SIM device.

24. The content provider node according to claim 21, wherein it comprises a distributer configured to provide the protected content to the *SIM device provided that the *SIM device can provide proof of successful authentication.

25. The content provider node according to claim 21, wherein it comprises an authenticator configured to issue and provision credential that will allow the content provider defined subdomain to receive a protected service by using a pull client-initiated GBA/GAA.

26. The content provider node according to claim 25, wherein it comprises an authenticator further configured to send an authenticated request for NAF session initiation to each of the *SIM devices hosting the *SIMs of the user-defined domain to trigger the *SIM device to launch a normal GBA.

27. The method of claim 1, wherein
creating a set of one or more unique *SIM identifiers prior to receiving the registration request, wherein each unique *SIM identifier included in the set is a member of the user-defined DRM domain; and
the step of registering the *SIM into the user-defined DRM domain comprises adding an identifier that identifies the

*SIM to the existing set of one or more *SIM identifiers, thereby establishing the *SIM as a member of the user-defined DRM domain.

28. The method of claim 27, wherein the set of one more unique *SIM identifiers is linked with an identifier that identifies the user.

* * * * *